(12) United States Patent
Abe et al.

(10) Patent No.: US 8,568,932 B2
(45) Date of Patent: Oct. 29, 2013

(54) NONAQUEOUS ELECTROLYTE SOLUTION AND LITHIUM SECONDARY BATTERY USING SAME

(75) Inventors: Koji Abe, Yamaguchi (JP); Kazuhiro Miyoshi, Yamaguchi (JP); Chisen Hashimoto, Yamaguchi (JP); Masahide Kondo, Yamaguchi (JP)

(73) Assignee: Ube Industries, Ltd., Ube-shi (JP)

( * ) Notice: Subject to any disclaimer, the term of this patent is extended or adjusted under 35 U.S.C. 154(b) by 1278 days.

(21) Appl. No.: 12/064,181

(22) PCT Filed: Aug. 10, 2006

(86) PCT No.: PCT/JP2006/315856
§ 371 (c)(1),
(2), (4) Date: Feb. 19, 2008

(87) PCT Pub. No.: WO2007/020876
PCT Pub. Date: Feb. 22, 2007

(65) Prior Publication Data
US 2009/0170006 A1    Jul. 2, 2009

(30) Foreign Application Priority Data

Aug. 18, 2005 (JP) ................................ 2005-237765
Jan. 20, 2006 (JP) ................................ 2006-012359
Feb. 20, 2006 (JP) ................................ 2006-042364

(51) Int. Cl.
*H01M 6/16* (2006.01)
(52) U.S. Cl.
USPC ........... 429/329; 429/326; 429/327; 429/337; 429/340; 429/332; 429/199; 429/200; 429/331; 252/62.2
(58) Field of Classification Search
USPC ......... 429/329, 326, 327, 337, 340, 332, 199, 429/200, 331; 252/62.2
See application file for complete search history.

(56) References Cited

U.S. PATENT DOCUMENTS

| 2003/0148191 A1 | 8/2003 | Mori |
| 2004/0072080 A1 | 4/2004 | Iwanaga et al. |

FOREIGN PATENT DOCUMENTS

| EP | 1 030 399 | 8/2000 |
| JP | 06-052896 | 7/1992 |
| JP | 06 295744 | 10/1994 |
| JP | 08 007922 | 1/1996 |
| JP | 08 037024 | 2/1996 |
| JP | 10-189042 | 12/1996 |
| JP | 9 120837 | 5/1997 |
| JP | 09 161845 | 6/1997 |
| JP | 2000 188127 | 7/2000 |
| JP | 2002-319430 | 4/2001 |
| JP | 2002 25611 | 1/2002 |
| JP | 2002 075446 | 3/2002 |
| JP | 2002 110234 | 4/2002 |
| JP | 2002 124297 | 4/2002 |
| JP | 2004-022523 | 6/2002 |
| JP | 2002 270230 | 9/2002 |
| JP | 2003 007333 | 1/2003 |
| JP | 2003 059529 | 2/2003 |
| JP | 2003 151623 | 5/2003 |
| JP | 2004 185931 | 7/2004 |
| JP | 2005 011762 | 1/2005 |
| JP | 2005 158302 | 6/2005 |
| JP | 2005 228721 | 8/2005 |

OTHER PUBLICATIONS

European Search Report mailed Dec. 10, 2010, in EP06782642 filed on Aug. 10, 2006.

*Primary Examiner* — Laura Weiner
(74) *Attorney, Agent, or Firm* — Oblon, Spivak, McClelland, Maier & Neustadt, L.L.P.

(57) ABSTRACT

The present invention provides a nonaqueous electrolytic solution in which an electrolyte salt is dissolved in a nonaqueous solvent, containing 0.01% to 30% by weight of a 1,2-cyclohexanediol derivative having a specific structure; and a lithium secondary battery using the nonaqueous electrolytic solution. The lithium secondary battery exhibits excellent battery characteristics such as electrical capacity, cycle property, and storage property and can maintain excellent long-term battery performance.

21 Claims, No Drawings

NONAQUEOUS ELECTROLYTE SOLUTION AND LITHIUM SECONDARY BATTERY USING SAME

TECHNICAL FIELD

The present invention relates to a nonaqueous electrolytic solution that can produce a lithium secondary battery exhibiting excellent battery characteristics, such as electrical capacity, cycle property and storage property, and to a lithium secondary battery using the nonaqueous electrolytic solution.

BACKGROUND ART

In recent years, lithium secondary batteries have been widely used as driving power supplies for small electronic devices and the like. Such lithium secondary batteries are mainly constituted of a positive electrode comprised of a lithium compound oxide, a negative electrode comprised of a carbon material or a lithium metal, and a nonaqueous electrolytic solution. As the nonaqueous electrolytic solution, carbonates such as ethylene carbonate (EC) and propylene carbonate (PC) are used.

A lithium secondary battery using, for example, $LiCoO_2$, $LiMn_2O_4$ or $LiNiO_2$ as a positive electrode material brings about a reduction of the battery performance, when part of the solvent of the nonaqueous electrolytic solution locally undergoes an oxidative decomposition during the charging, because the decomposition products inhibit the desired electrochemical reaction of the battery. Such a reduction is considered to be attributed to an electrochemical oxidation of the solvent at the interface between the positive electrode material and the nonaqueous electrolytic solution.

Also, a lithium secondary battery using, for example, a highly crystallized carbon material, such as natural graphite or artificial graphite, as a negative electrode material brings about a reduction of the battery performance, when the solvent of the nonaqueous electrolytic solution undergoes a reductive decomposition on the surface of the negative electrode during the charging. Even in the case of EC, which is widely used as a solvent for the nonaqueous electrolytic solution, it partly undergoes reductive decomposition during repeated charging and discharging cycles, resulting in reduction of the battery performance.

Particularly, decomposition of the nonaqueous electrolytic solution on the positive electrode and the negative electrode causes gas generation, which leads to expansion of the battery and impairs mobility of lithium ions as a result of trapping of the gas between the electrodes, thereby reducing the battery performance.

Techniques for improving the battery characteristics of such lithium secondary batteries are known, for example, in Patent Documents 1 to 5. Patent Document 1 discloses a nonaqueous electrolytic solution containing 0.05% to 10% by volume of glycol sulfite (also referred to as ethylene sulfite) as a cyclic sulfite. However, this document does not describe the retention of capacity at high temperatures.

Patent Document 2 discloses a nonaqueous electrolytic solution containing erythritan sulfite as a cyclic sulfite. However, in Examples of this document, merely 3 cycles are tested, and cycle property, for example, after 100 cycles is not evaluated. This document also does not describe cycle property in a high-temperature environment.

Patent Document 3 discloses a nonaqueous electrolytic solution containing ethylene sulfite, erythritan sulfite and the like to improve cycle property. However, this nonaqueous electrolytic solution exhibits a low charging and discharging efficiency and insufficient characteristics in a high-temperature environment.

Patent Document 4 discloses a nonaqueous electrolytic solution containing ethylene sulfite and vinylene carbonate. In an optimum Example, this document describes that the retention of capacity after 100 cycles at 45° C. is 90.0%. However, a nonaqueous electrolytic solution having a higher retention of capacity is still desired.

Patent Document 5 discloses a nonaqueous electrolytic solution containing 1,3,2-dioxathiolane-2,2-dioxide and the like as a sulfate compound for lithium secondary batteries and describes excellent storage property of the battery which is left to stand at high temperatures in a charged state. In this nonaqueous electrolytic solution, the battery characteristics are improved to some extent but are still far from satisfaction. Nonaqueous electrolytic solutions and lithium secondary batteries having further improved characteristics are needed.

[Patent Document 1] Japanese Unexamined Patent Application Publication No. 9-120837
[Patent Document 2] Japanese Unexamined Patent Application Publication No. 2000-188127
[Patent Document 3] Japanese Unexamined Patent Application Publication No. 2002-270230
[Patent Document 4] Japanese Unexamined Patent Application Publication No. 2002-25611
[Patent Document 5] Japanese Unexamined Patent Application Publication No. 2004-185931

DISCLOSURE OF THE INVENTION

It is an object of the present invention to provide a nonaqueous electrolytic solution having excellent battery characteristics such as electrical capacity, cycle property and storage property and capable of maintaining excellent long-term battery performance, and to provide a lithium secondary battery using the nonaqueous electrolytic solution.

The inventors have found that incorporation of a specific amount of a specific 1,2-cyclohexanediol derivative into a nonaqueous electrolytic solution can reduce gas generation even when the battery is stored at high temperatures in a highly charged state, and can maintain the battery performance such as long-term cycle property, and have accomplished the present invention.

Thus, the present invention provides the following aspects (1) and (2):

(1) A nonaqueous electrolytic solution in which an electrolyte salt is dissolved in a nonaqueous solvent, comprising 0.01% to 30% by weight of at least one compound selected from the group consisting of 1,2-cyclohexanediol cyclic sulfite, 1,2-cyclohexanediol cyclic carbonate, hexahydro-1,3,2-benzodioxathiol-2,2-dioxide, and 1,2-cyclohexanediol derivatives represented by the following general formula (X), on the basis of the weight of the nonaqueous electrolytic solution:

[Formula 1]

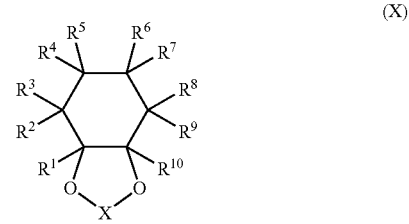

(X)

wherein $R^1$ to $R^{10}$ each independently represent a hydrogen atom, a $C_1$ to $C_{12}$ alkyl group, a $C_2$ to $C_{12}$ alkenyl group, a $C_2$ to $C_{12}$ alkynyl group, a $C_6$ to $C_{18}$ aryl group, or a $C_1$ to $C_{12}$ alkoxy group, and may bond to each other to form a ring structure, and any hydrogen atom of $R^1$ to $R^{10}$ may be substituted by a halogen atom, with the proviso that the case where all of $R^1$ to $R^{10}$ are hydrogen atoms is excluded; and X represents a >S=O group or a >C=O group.

(2) A lithium secondary battery comprising a positive electrode, a negative electrode, and a nonaqueous electrolytic solution in which an electrolyte salt is dissolved in a nonaqueous solvent, wherein the nonaqueous electrolytic solution comprises 0.01% to 30% by weight of at least one compound selected from the group consisting of 1,2-cyclohexanediol cyclic sulfite, 1,2-cyclohexanediol cyclic carbonate, hexahydro-1,3,2-benzodioxathiol-2,2-dioxide, and 1,2-cyclohexanediol derivatives represented by the general formula (X), on the basis of the weight of the nonaqueous electrolytic solution.

The lithium secondary battery using the nonaqueous electrolytic solution of the present invention can exhibit excellent battery characteristics such as electrical capacity, cycle property and storage property, and more particularly, can exhibit excellent long-term battery performance in a high-temperature environment.

DETAILED DESCRIPTION OF THE INVENTION 1,2-Cyclohexanediol Cyclic Sulfite 1,2-Cyclohexanediol cyclic sulfites used in the present invention are sulfite compounds represented by the following general formula (I):

[Formula 2]

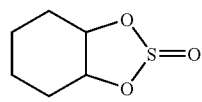

(I)

1,2-Cyclohexanediol cyclic sulfites (CAS No. 4705-18-4) represented by the formula (I) include a cis isomer (CAS No. 19456-18-9) represented by the following formula (II) and a trans isomer (CAS No. 19456-19-0) represented by the following formula (III):

[Formula 3]

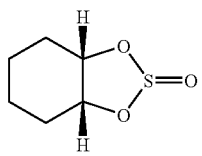

(II)

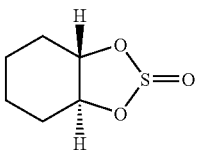

(III)

The trans isomer is preferred to the cis isomer, but a mixture (hereinafter, may be referred to as "isomer mixture") of the trans and cis isomers mixed at a specific ratio may also be used. In particular, the ratio of the trans isomer to the cis isomer (weight ratio) preferably ranges from 50/50 to 100/0. In the case of the isomer mixture, the ratio more preferably ranges from 55/45 to 90/10.

The trans isomer has a higher dipole moment (3.6 debye) than that (2.9 debye) of the cis isomer and is more strained than the cis form. Thus, it is believed that the strained sulfite compound acts on the interface of a negative electrode and facilitates intercalation and deintercalation of Li ions.

1,2-Cyclohexanediol Cyclic Carbonate 1,2-Cyclohexanediol cyclic carbonates (hexahydro-1,3-benzodioxol-2-ones) used in the present invention are alicyclic cyclic carbonates represented by the following formula (IV):

[Formula 4]

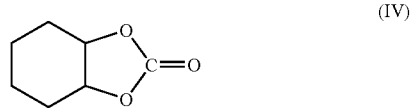

(IV)

1,2-Cyclohexanediol cyclic carbonates represented by the formula (IV) include a cis isomer (CAS No. 19456-20-3) represented by the following formula (V) and a trans isomer (CAS No. 20192-66-9) represented by the following formula (VI). The trans isomer is a mixture of optical isomers. These isomers may be used alone or in combination.

[Formula 5]

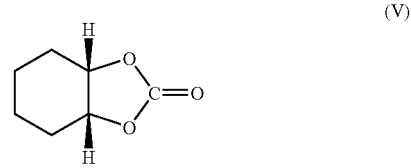

(V)

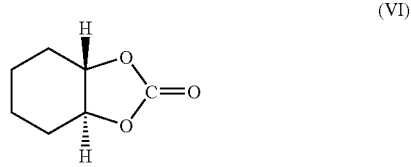

(VI)

Hexahydro-1,3,2-Benzodioxathiol-2,2-Dioxide

Hexahydro-1,3,2-benzodioxathiol-2,2-dioxides used in the present invention are sulfate compounds represented by the following formula (VII):

[Formula 6]

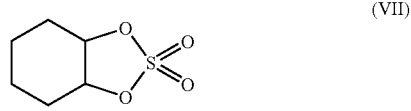

(VII)

Hexahydro-1,3,2-benzodioxathiol-2,2-dioxide represented by the formula (VII) include a cis isomer (CAS No. 6970-90-7) represented by the following formula (VIII) and a trans isomer (CAS No. 6970-91-8) represented by the following formula (IX). The trans isomer is a mixture of optical isomers. These isomers may be used alone or in combination.

[Formula 7]

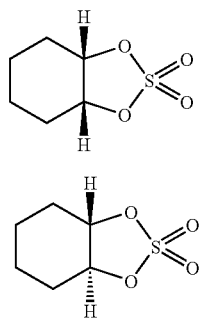

(VIII)

(IX)

In the 1,2-cyclohexanediol cyclic carbonates and hexahydro-1,3,2-benzodioxathiol-2,2-dioxides, the trans isomers are preferred to the cis isomers. In the case of using mixtures of the trans and cis isomers, the weight ratio of the trans isomer to the cis isomer preferably ranges from 50/50 to 95/5 and more preferably from 55/45 to 90/10.

1,2-Cyclohexanediol Derivatives 1,2-Cyclohexanediol derivatives used in the present invention is represented by the following general formula (X):

[Formula 8]

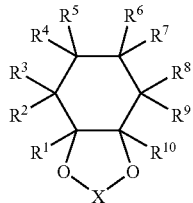

(X)

In the general formula (X), $R^1$ to $R^{10}$ each independently represent a hydrogen atom, a C1 to C12 alkyl group, a C2 to C12 alkenyl group, a C2 to C12 alkynyl group, a C6 to C18 aryl group, or a C1 to C12 alkoxy group, and may bond to each other to form a ring structure and any hydrogen atom of $R^1$ to $R^{10}$ may be substituted by a halogen atom, with the proviso that the case where all of $R^1$ to $R^{10}$ are hydrogen atoms is excluded.

X represents a >S=O group or a >C=O group. When X is the >S=O group, the formula (X) represents alicyclic cyclic sulfite compounds (1,2-cyclohexanediol cyclic sulfite derivatives). When X is the >C=O group, the formula (X) represents alicyclic cyclic carbonate compounds (1,2-cyclohexanediol cyclic carbonate derivatives).

The 1,2-cyclohexanediol derivatives used in the present invention may be a mixture of the alicyclic cyclic sulfite compounds and the alicyclic cyclic carbonate compounds.

In the general formula (X), preferably, $R^1$ to $R^{10}$ each independently represent a hydrogen atom, a C1 to C8 alkyl group, a C2 to C8 alkenyl group, a C2 to C8 alkynyl group, a C6 to C12 aryl group, or a C1 to C8 alkoxy group. More preferably, $R^1$ to $R^{10}$ each independently represent a hydrogen atom, a C1 to C6 alkyl group, a C2 to C6 alkenyl group, a C2 to C6 alkynyl group, a C6 to C12 aryl group, or a C1 to C4 alkoxy group. Most preferably, $R^1$ to $R^{10}$ each represent a C2 to C4 alkenyl group or a C2 to C4 alkynyl group.

In the case where all of $R^1$ to $R^{10}$ are hydrogen atoms, the formula (X) represents the 1,2-cyclohexanediol cyclic sulfite or the 1,2-cyclohexanediol cyclic carbonate.

The 1,2-cyclohexanediol derivatives represented by the general formula (X) include isomers represented by the following general formulae (XI) and (XII). These isomers may be used alone or in combination.

[Formula 9]

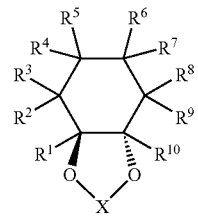

(XI)

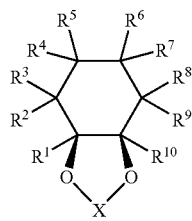

(XII)

Specific examples of 1,2-cyclohexanediol derivatives represented by the general formula (X) are shown below:
(1) Alicyclic Cyclic Sulfite Compounds (in the Case of X Representing a >S=O Group)

Specific examples of the alicyclic cyclic sulfite compounds represented by the general formula (X) include 1,2-cyclohexanediol cyclic sulfite derivatives (hexahydro-1,3,2-benzodioxathiol-2-oxide derivatives). Specific examples of the derivatives include 4-propyl-1,2-cyclohexanediol cyclic sulfite, 3-vinyl-1,2-cyclohexanediol cyclic sulfite, 4-vinyl-1,2-cyclohexanediol cyclic sulfite, 1-methyl-4-(1-methylethenyl)-1,2-cyclohexanediol cyclic sulfite, 3-(1-methylethyl)-1,2-cyclohexanediol cyclic sulfite, 4-(1-methylethyl)-1,2-cyclohexanediol cyclic sulfite, 3-methyl-6-(1-methylethyl)-1,2-cyclohexanediol cyclic sulfite, 3-methoxy-1,2-cyclohexanediol cyclic sulfite, 3-methoxy-3-methyl-6-(1-methylethenyl)-1,2-cyclohexanediol cyclic sulfite, 4-bicyclo[2.2.1]hept-2-yl-1,2-cyclohexanediol cyclic sulfite, (1S,2S,3R,5R)-(+)-pinanediol cyclic sulfite, and (1R,2R,3S,5S)-(−)-pinanediol cyclic sulfite. Among these, at least one compound selected from the group consisting of 4-vinyl-1,2-cyclohexanediol cyclic sulfite (5-vinyl-hexahydro-1,3,2-benzodioxathiol-2-oxide), and 4-propyl-1,2-cyclohexanediol cyclic sulfite is particularly preferred.

(2) Alicyclic Cyclic Carbonate Compounds (in the Case of X Representing a >C=O Group)

Specific examples of the alicyclic cyclic carbonate compounds represented by the general formula (I) include 1,2-cyclohexanediol cyclic carbonate derivatives (hexahydro-1,3-benzodioxol-2-one derivatives). Specific examples of the derivatives include 4-propyl-1,2-cyclohexanediol cyclic carbonate, 3-vinyl-1,2-cyclohexanediol cyclic carbonate, 4-vinyl-1,2-cyclohexanediol cyclic carbonate, 1-methyl-4-(1-methylethenyl)-1,2-cyclohexanediol cyclic carbonate, 3-(1-methylethyl)-1,2-cyclohexanediol cyclic carbonate, 4-(1-methylethyl)-1,2-cyclohexanediol cyclic carbonate, 3-methyl-6-(1-methylethyl)-1,2-cyclohexanediol cyclic carbonate, 3-methoxy-1,2-cyclohexanediol cyclic carbonate, 3-methoxy-3-methyl-6-(1-methylethenyl)-1,2-cyclohexanediol cyclic carbonate, 4-bicyclo[2.2.1]hepti-2-yl-1,2-cyclohexanediol cyclic carbonate, (1S,2S,3R,5R)-(+)-pinanediol cyclic carbonate, and (1R,2R,3S,5S)-(−)-pinanediol cyclic carbonate. Among these, at least one compound selected from the group consisting of 4-vinyl-1,2-cyclohexanediol cyclic carbonate (5-vinyl-hexahydro-1,3-benzodioxol-2-one) and 4-propyl-1,2-cyclohexanediol cyclic carbonate is particularly preferred.

[Nonaqueous Electrolytic Solution]

The nonaqueous electrolytic solution of the present invention contains 0.01% to 30% by weight of at least one compound selected from the group consisting of 1,2-cyclohexanediol cyclic sulfite, 1,2-cyclohexanediol cyclic carbonate, hexahydro-1,3,2-benzodioxathiol-2,2-dioxide, and 1,2-cyclohexanediol derivatives represented by the general formula (X), on the basis of the weight of the nonaqueous electrolytic solution, and a nonaqueous solvent in which an electrolyte salt is dissolved.

In the nonaqueous electrolytic solution of the present invention, when a content of 1,2-cyclohexanediol cyclic sulfite exceeds 10% by weight in the nonaqueous electrolytic solution, cycle property may get worse. When a content of the compound is less than 0.01% by weight, target cycle property may not be obtained. Therefore, the content of the compound is preferably 0.01% by weight or more, more preferably 0.1% by weight or more, and most preferably 0.3% by weight or more, on the basis of the weight of the nonaqueous electrolytic solution. Furthermore, the upper limit of the content of the compound is desirably 10% by weight or less, preferably 8% by weight or less, more preferably 5% by weight or less, and most preferably 3% by weight or less.

In the nonaqueous electrolytic solution of the present invention, when a content of 1,2-cyclohexanediol cyclic carbonate exceeds 30% by weight in the nonaqueous electrolytic solution, cycle property may get worse. When a content of the compound is less than 0.1% by weight, target cycle property may not be obtained. Therefore, the content of the compound is preferably 0.1% by weight or more, more preferably 1% by weight or more, and most preferably 3% by weight or more, on the basis of the weight of the nonaqueous electrolytic solution. Furthermore, the upper limit of the content of the compound is preferably 30% by weight or less, more preferably 25% by weight or less, and most preferably 20% by weight or less.

In the nonaqueous electrolytic solution of the present invention, when a content of hexahydro-1,3,2-benzodioxathiol-2,2-dioxide exceeds 10% by weight in the nonaqueous electrolytic solution, cycle property may get worse. When a content of the compound is less than 0.01% by weight, target cycle property may not be obtained. Therefore, the content of the compound is preferably 0.01% by weight or more, more preferably 0.1% by weight or more, and most preferably 0.3% by weight or more, on the basis of the weight of the nonaqueous electrolytic solution. Furthermore, the upper limit of the content of the compound is preferably 10% by weight or less, more preferably 7% by weight or less, and most preferably 5% by weight or less.

In the nonaqueous electrolytic solution of the present invention, when a content of 1,2-cyclohexanediol cyclic sulfite derivatives (hexahydro-1,3,2-benzodioxathiol-2-oxide derivatives) exceeds 20% by weight in the nonaqueous electrolytic solution, cycle property may get worse. When a content of the compound is less than 0.01% by weight, target cycle property may not be obtained. Therefore, the content of the compound is preferably 0.01% by weight or more, more preferably 0.1% by weight or more, and most preferably 0.3% by weight or more, on the basis of the weight of the nonaqueous electrolytic solution. Furthermore, the upper limit of the content of the compound is preferably 20% by weight or less, more preferably 10% by weight or less, and most preferably 5% by weight or less.

A content of 1,2-cyclohexanediol cyclic carbonate derivatives (hexahydro-1,3-benzodioxol-2-one derivatives) exceeding 20% by weight in the nonaqueous electrolytic solution may impair cycle property. A content of the compound of less than 0.01% by weight cannot lead to target cycle property. Therefore, the content of the compound is preferably 0.01% by weight or more, more preferably 0.1% by weight or more, and most preferably 0.3% by weight or more, on the basis of the weight of the nonaqueous electrolytic solution. Furthermore, the upper limit of the content of the compound is preferably 20% by weight or less, more preferably 10% by weight or less, and most preferably 5% by weight or less.

In the case of combined use of an alicyclic cyclic sulfite compound (1,2-cyclohexanediol cyclic sulfite derivative) and an alicyclic cyclic carbonate compound (1,2-cyclohexanediol cyclic carbonate derivative), the content of each compound is preferably 0.01% by weight or more, more preferably 0.1% by weight or more, and most preferably 1% by weight or more, on the basis of the weight of the nonaqueous electrolytic solution. Furthermore, the upper limit of the content of each compound is preferably 20% by weight or less, more preferably 14% by weight or less, and most preferably 10% by weight or less.

[Other Additives]

In the nonaqueous electrolytic solution of the present invention, from the viewpoint of the improvement of charging and discharging characteristics, preferred is a combined use of at least one compound selected from the group consisting of 1,2-cyclohexanediol cyclic sulfite, 1,2-cyclohexanediol cyclic carbonate, hexahydro-1,3,2-benzodioxathiol-2,2-dioxide, and 1,2-cyclohexanediol derivatives represented by the general formula (X) and at least one compound selected from the group consisting of vinylene carbonate (VC), 1,3-propane sultone (PS), and triple bond-containing compounds.

When a content of vinylene carbonate and 1,3-propane sultone is significantly large, battery characteristics may get worse, whereas, when a content of these compounds is significantly low, target battery characteristics may not be obtained.

More specifically, a content of vinylene carbonate of less than 0.1% by volume on the basis of the volume of the nonaqueous electrolytic solution reduces the effect of addition. A content of the compound exceeding 10% by volume may impair cycle property. Therefore, the content of the compounds is preferably 0.1% by volume or more, more preferably 0.5% by volume or more, and most preferably 1% by volume or more, on the basis of the volume of the nonaqueous electrolytic solution. Furthermore, the upper limit of the content of the compound is preferably 10% by volume or less, more preferably 5% by volume or less, and most preferably 3% by volume or less.

A content of 1,3-propane sultone of less than 0.1% by volume on the basis of the volume of the nonaqueous electrolytic solution reduces the effect of addition. A content of the compound exceeding 10% by volume may impair cycle property. Therefore, the content of the compound is preferably 0.1% by volume or more, more preferably 0.5% by volume or more, and most preferably 1% by volume or more, on the basis of the volume of the nonaqueous electrolytic solution. Furthermore, the upper limit of the content of the compound is preferably 10% by volume or less, more preferably 5% by volume or less, and most preferably 3% by volume or less.

A large density of an electrode mixture for high-capacity batteries typically leads to deterioration of cycle property. Thus, a combined use of a triple bond-containing compound is preferred to improve cycle property.

Examples of the triple bond-containing compounds include methyl propargyl carbonate (MPC), ethyl propargyl carbonate (EPC), dipropargyl carbonate (DPC), dipropargyl oxalate (DPO), propargyl methanesulfonate, dipropargyl sulfite, methyl propargyl sulfite, and ethyl propargyl sulfite.

A content of the triple bond-containing compound of less than 0.01% by volume on the basis of the volume of the nonaqueous electrolytic solution reduces the effect of addition. A content of the compound exceeding 10% by volume may impair cycle property. Therefore, the content of the compound is preferably 0.01% by volume or more, more preferably 0.1% by volume or more, and most preferably 0.5% by volume or more, on the basis of the volume of the nonaqueous electrolytic solution. Furthermore, the upper limit of the content of the compound is preferably 10% by volume or less, more preferably 5% by volume or less, and most preferably 3% by volume or less.

[Nonaqueous Solvent]

Examples of nonaqueous solvents used in the nonaqueous electrolytic solution of the present invention include cyclic carbonates, linear carbonates, linear esters, ethers, amides, phosphoric esters, sulfones, lactones, nitrites, and compounds containing a >S=O group.

Examples of the cyclic carbonates include ethylene carbonate (EC), propylene carbonate (PC), butylene carbonate, fluoroethylene carbonate, dimethylvinylene carbonate, and vinylethylene carbonate. In particular, incorporation of EC and/or PC having a high dielectric constant is most preferred to improve conductivity of a nonaqueous electrolytic solution.

Examples of the linear carbonates include asymmetric carbonates such as methyl ethyl carbonate (MEC), methyl propyl carbonate, methyl butyl carbonate, and ethyl propyl carbonate; and symmetric carbonates such as dimethyl carbonate (DMC), diethyl carbonate (DEC), dipropyl carbonate, and dibutyl carbonate.

Examples of the linear esters include methyl propionate, methyl pivalate, butyl pivalate, hexyl pivalate, octyl pivalate, dimethyl oxalate, ethyl methyl oxalate, and diethyl oxalate. Examples of the ethers include tetrahydrofuran, 2-methyl tetrahydrofuran, 1,4-dioxane, 1,2-dimethoxyethane, 1,2-diethoxyethane, and 1,2-dibutoxyethane. Examples of the amides include dimethylformamide. Examples of the phosphoric esters include trimethyl phosphate and trioctyl phosphate. Examples of the sulfones include divinylsulfone. Examples of the lactones include γ-butyrolactone, γ-valerolactone, and α-angelicalactone. Examples of the nitriles include acetonitrile and adiponitrile.

Examples of the preferred compounds containing a >S=O group include 1,4-propane sultone, divinylsulfone, 1,4-butanediol dimethanesulfonate, glycol sulfite, propylene sulfite, glycol sulfate, propylene sulfate, dipropargyl sulfite, methyl propargyl sulfite, ethyl propargyl sulfite, and divinylsulfone.

These nonaqueous solvents may generally be used in combination to achieve appropriate properties. Examples of such combinations include combinations of cyclic carbonates and linear carbonates; combinations of cyclic carbonates and lactones; combinations of lactones and linear esters; combinations of cyclic carbonates, lactones, and linear esters; combinations of cyclic carbonates, linear carbonates, and lactones; combinations of cyclic carbonates and ethers; combinations of cyclic carbonates, linear carbonates, and ethers; and combinations of cyclic carbonates, linear carbonates, and linear esters. The mixing ratio in such combinations is not particularly limited.

Among these, combinations of cyclic carbonates and linear carbonates are preferred. In particular, combinations of cyclic carbonates such as EC and PC, and linear carbonates such as MEC and DEC are preferred for improvements in cycle property. The proportion of cyclic carbonates and linear carbonates is preferably determined such that the volume ratio of cyclic carbonates to linear carbonates ranges from 10:90 to 40:60, more preferably from 20:80 to 40:60, and most preferably from 25:75 to 35:65.

[Electrolyte Salts]

Examples of electrolyte salts used in the present invention include lithium salts such as $LiPF_6$, $LiBF_4$, and $LiClO_4$; alkyl-containing lithium salts such as $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C_3F_7)$; and cycloalkylene-containing lithium salts such as $(CF_2)_2(SO_2)_2NLi$ and $(CF_2)_3(SO_2)_2NLi$.

Among these, electrolyte salts particularly preferred are $LiPF_6$, $LiBF_4$, and $LiN(SO_2CF_3)_2$. The most preferred electrolyte salt is $LiPF_6$. These electrolyte salts may be used alone or in combination.

Examples of preferred combinations of these electrolyte salts include a combination of $LiPF_6$ and $LiBF_4$, a combination of $LiPF_6$ and $LiN(SO_2CF_3)_2$, and a combination of $LiBF_4$ and $LiN(SO_2CF_3)_2$. Particularly preferred is a combination of $LiPF_6$ and $LiBF_4$. A proportion of $LiPF_6$ below the level of the molar ratio of $LiPF_6$ to $LiBF_4$ of 80:20 or at a proportion of $LiPF_6$ above the level of the molar ratio of $LiPF_6$ to $LiBF_4$ of 99:1 may impair cycle property. Therefore, the molar ratio of $LiPF_6$ to $LiBF_4$ preferably ranges from 80:20 to 99:1 and more preferably from 90:10 to 98:2.

The electrolyte salts can be mixed at any ratio. In the case of a combined use of any other electrolyte salt with $LiPF_6$, a proportion (molar ratio) of the other electrolyte salt of less than 0.01% on the basis of the total amount of the electrolyte salts may not significantly improve storage property at high temperatures. A proportion of the salt of more than 45% may impair storage property at high temperatures. Therefore, the proportion (molar ratio) of the compounds desirably ranges from 0.01% to 45%, preferably from 0.03% to 20%, more preferably from 0.05% to 10%, and most preferably from 0.05% to 5%.

The concentration of the total amount of these electrolyte salts is generally 0.3 M or more, more preferably 0.5 M or more, and most preferably 0.7 M or more, on the basis of the amount of the nonaqueous solvent. Furthermore, the upper limit of the concentration thereof is preferably 2.5 M or less, more preferably 1.5 M or less, and most preferably 1.2 M or less.

[Preparation of Nonaqueous Electrolytic Solution]

The nonaqueous electrolytic solution of the present invention may be prepared, for example, by mixing nonaqueous solvents, dissolving an electrolyte salt and at least one compound selected from the group consisting of 1,2-cyclohexanediol cyclic sulfite, 1,2-cyclohexanediol cyclic carbonate, hexahydro-1,3,2-benzodioxathiol-2,2-dioxide, and 1,2-cyclohexanediol derivatives represented by the general formula (X) therein, and optionally dissolving at least one compound selected from the group consisting of vinylene carbonate (VC), 1,3-propane sultone (PS), and triple bond-containing compounds, therein.

It is preferred that the nonaqueous solvents, 1,2-cyclohexanediol cyclic sulfite, 1,2-cyclohexanediol cyclic carbonate, hexahydro-1,3,2-benzodioxathiol-2,2-dioxide, 1,2-cyclohexanediol derivatives represented by the general formula (X), VC, PS, triple bond-containing compounds, and other additives used are previously purified to reduce impurities as much as possible within the scope not causing decreased productivity.

Incorporation of, for example, air or carbon dioxide in the nonaqueous electrolytic solution of the present invention can prevent gas generation due to decomposition of the electrolytic solution and can improve battery characteristics such as long-term cycle property and charging and storage property.

Methods for incorporating (dissolving) air or carbon dioxide in the nonaqueous electrolytic solution include (1) bringing the nonaqueous electrolytic solution into contact with air or carbon dioxide-containing gas before the solution is fed into a battery; or (2) feeding the solution into a battery and then incorporating air or carbon dioxide-containing gas in the solution before or after the battery is sealed. It is preferred that the air or carbon dioxide-containing gas contain moisture as little as possible and have a dew point of −40° C. or below, and more preferably −50° C. or below.

In the present invention, use of a nonaqueous electrolytic solution containing dissolved carbon dioxide is particularly preferred in order to improve charging and discharging characteristics at high temperatures. The amount of dissolved carbon dioxide is desirably 0.001% by weight or more, preferably 0.05% by weight or more, and more preferably 0.2% by weight or more. A nonaqueous electrolytic solution containing saturated carbon dioxide is most preferred.

The nonaqueous electrolytic solution of the present invention may further contain an aromatic compound to enhance the safety of overcharged batteries.

Examples of such aromatic compounds include the following groups (a) to (c):
(a) Cyclohexylbenzene, fluorocyclohexylbenzene compounds (1-fluoro-2-cyclohexylbenzene, 1-fluoro-3-cyclohexylbenzene, and 1-fluoro-4-cyclohexylbenzene), and biphenyl;
(b) tert-Butylbenzene, 1-fluoro-4-tert-butylbenzene, tert-amylbenzene, 4-tert-butylbiphenyl, 4-tert-amylbiphenyl, and 1,3-di-tert-butylbenzene;
(c) Terphenyls (o-, m- and p-), diphenyl ether, 2-fluorodiphenyl ether, 4-diphenyl ether, fluorobenzene, difluorobenzenes (o-, m- and p-), 2-fluorobiphenyl, 4-fluorobiphenyl, 2,4-difluoroanisole, and partially hydrogenated terphenyls (1,2-dicyclohexylbenzene, 2-phenylbicyclohexyl, 1,2-diphenylcyclohexane, and o-cyclohexylbiphenyl).

Among these, groups (a) and (b) are preferred. Most preferred is at least one compound selected from the group consisting of cyclohexylbenzene, fluorocyclohexylbenzene compounds (1-fluoro-4-cyclohexylbenzene and the like), tert-butylbenzene, tert-amylbenzene, and 1,3-di-tert-butylbenzene.

A total content of the aromatic compound of less than 0.1% by weight on the basis of the weight of the nonaqueous electrolytic solution may not effectively prevent overcharging. A total content of the compound of more than 5% by weight may impair cycle property. Therefore, the total content of the compound preferably ranges from 0.1% to 5% by weight.

[Lithium Secondary Battery]

The lithium secondary battery of the present invention comprises a positive electrode, a negative electrode, and a nonaqueous electrolytic solution in which an electrolyte salt is dissolved in a nonaqueous solvent. These components, such as a positive electrode and a negative electrode, other than the nonaqueous electrolytic solution can be used without limitation.

For example, usable positive electrode active materials include complex metal oxides of lithium with cobalt, manganese, or nickel. Such positive electrode active materials may be used alone or in combination.

Examples of such lithium-containing complex metal oxides include $LiCoO_2$, $LiMn_2O_4$, $LiNiO_2$, $LiCO_{1-x}Ni_xO_2$ (0.01<x<1), $LiCO_{1/3}Ni_{1/3}Mn_{1/3}O_2$, $LiNi_{1/2}Mn_{3/2}O_4$, and $LiCo_{0.98}Mg_{0.02}O_2$. These oxides may be used in a combination of, for example, $LiCoO_2$ and $LiMn_2O_4$, $LiCoO_2$ and $LiNiO_2$, or $LiMn_2O_4$ and $LiNiO_2$.

An element of the lithium-containing complex oxides may be partly substituted by any other element to improve safety or cycle property of overcharged batteries and to enable the batteries to be used at a charging potential of 4.3 V or more. For example, part of cobalt, manganese, or nickel may preferably be substituted by at least one element selected from the group consisting of Sn, Mg, Fe, Ti, Al, Zr, Cr, V, Ga, Zn, Cu, Bi, Mo, and La. Part of O may preferably be substituted by S or F. Alternatively, the lithium-containing complex oxides are preferably coated with a compound containing these substituent elements.

Among these, preferably used are lithium-containing complex metal oxides, such as $LiCoO_2$, $LiMn_2O_4$, and $LiNiO_2$, which can be used at a charging potential of the positive electrode 4.3 V or higher with reference to Li in a fully charged state. Lithium-containing complex metal oxides such as $LiCO_{1-x}M_xO_2$ (where M represents at least one element selected from the group consisting of Sn, Mg, Fe, Ti, Al, Zr, Cr, V, Ga, Zn, and Cu and X is $0.001 \leq x \leq 0.05$), $LiCo_{1/3}Ni_{1/3}Mn_{1/3}O_2$ and $LiNi_{1/2}Mn_{3/2}O_4$, which are usable at 4.4 V or higher, are more preferred.

As a positive electrode active material, lithium-containing olivine phosphates may be also used. Specific examples of such phosphates include $LiFePO_4$, $LiCoPO_4$, $LiNiPO_4$, $LiMnPO_4$, and $LiFe_{1-x}M_xPO_4$ (where M represents at least one element selected from the group consisting of Co, Ni, Mn, Cu, Zn, and Cd and x is $0 \leq x \leq 0.5$). Among these, $LiFePO_4$ or $LiCoPO_4$ is particularly preferred as a positive electrode active material for high-voltage use.

The lithium-containing olivine phosphate may be used in the form of a mixture with any other positive electrode active material.

The conductive material for the positive electrode may be any electron conductive material which does not undergo a chemical change. Examples of such conductive materials include graphites, for example, natural graphite (flake graphite) and artificial graphite, and carbon blacks, for example, acetylene black, ketjen black, channel black, furnace black, lamp black, and thermal black. The graphites and the carbon blacks may be used as an appropriate mixture. The amount of the conductive material added to a positive electrode mixture preferably ranges from 1% to 10% by weight and particularly preferably from 2% to 5% by weight.

The positive electrode may be prepared by mixing a positive electrode active material, a conductive material such as acetylene black or carbon black, and a binder such as polytetrafluoroethylene, polyvinylidene fluoride, a styrene-butadiene copolymer, an acrylonitrile-butadiene copolymer, carboxymethyl cellulose, and an ethylene-propylene-diene terpolymer, kneading the mixture with a high-boiling point solvent such as 1-methyl-2-pyrrolidone to prepare a positive electrode mixture, then rolling the resulting positive electrode material on a collector such as an aluminum foil or a lath board made of stainless steel, and then heating the resulting assembly at a temperature in the range of 50° C. to 250° C. for about 2 hours under vacuum.

Usable materials for the negative electrode (negative electrode active materials) include lithium metal, lithium alloys, carbon materials that can intercalate and deintercalate lithium (thermally decomposed carbon materials, cokes, graphites (such as artificial graphite and natural graphite), fired organic polymer compounds, and carbon fibers), tin, a tin compound, silicon, and a silicon compound. These materials may be used singly or in combination of two or more thereof.

Among these, carbon materials are preferred. More preferred are carbon materials which have a graphite crystal structure having a lattice spacing ($d_{002}$) of the lattice face (002) of 0.340 nm or less and particularly in the range of 0.335 to 0.337 nm. Since low-crystallinity carbon materials that have lower crystallinity than the carbon material described above can enhance the effect of addition of 1,2-cyclohexanediol cyclic sulfite, 1,2-cyclohexanediol cyclic carbonate, hexahydro-1,3,2-benzodioxathiol-2,2-dioxide, and 1,2-cyclohexanediol derivatives represented by the general formula (X), it is particularly preferred that the surface of the carbon material having a graphite crystal structure is partly or completely coated with this low-crystallinity carbon material. The state of the surface coating with the low-crystallinity carbon material can be detected by the observation of a cross section of the carbon material with a transmission electron microscope.

Tin, tin compounds, silicon, and silicon compounds are also preferred because these compounds can enhance the battery capacity.

The negative electrode may be prepared using the same binder and the same high-boiling-point solvent as in the method of preparing the positive electrode.

In the present invention, it is preferable to increase the density of the electrode mixture for the battery in order to enhance the effect of addition of at least one compound selected from the group consisting of 1,2-cyclohexanediol cyclic sulfite, 1,2-cyclohexanediol cyclic carbonate, hexahydro-1,3,2-benzodioxathiol-2,2-dioxide, and 1,2-cyclohexanediol derivatives represented by the general formula (X). In particular, the density of the positive electrode (positive electrode mixture layer) formed on an aluminum foil is preferably 3.2 g/cm$^3$ or more, more preferably 3.3 g/cm$^3$ or more, and most preferably 3.4 g/cm$^3$ or more. The upper limit of the density of the positive electrode exceeding 4.0 g/cm$^3$ may not readily prepare the positive electrode mixture layer in some cases. Therefore, the density of the positive electrode is preferably 4.0 g/cm$^3$ or lower, more preferably 3.9 g/cm$^3$ or lower, and most preferably 3.8 g/cm$^3$ or lower.

The density of the negative electrode (negative electrode mixture layer) formed on a copper foil is preferably 1.3 g/cm$^3$ or more, more preferably 1.4 g/cm$^3$ or more, and most preferably 1.5 g/cm$^3$ or more. The upper limit of the density of the negative electrode exceeding 2.0 g/cm$^3$ may not readily prepare the negative electrode mixture layer in some cases. Therefore, the density of the negative electrode is preferably 2.0 g/cm$^3$ or lower, more preferably 1.9 g/cm$^3$ or lower, and most preferably 1.8 g/cm$^3$ or lower.

A significantly small thickness of the electrode layer of the positive electrode (for one side of the collector) may lead to a reduction in the amount of the active material in the electrode material layer and thus a reduction in the battery capacity. Thus, the thickness of the electrode layer of the positive electrode is preferably 30 µm or more and more preferably 50 µm or more. A significantly large thickness of the electrode material layer may lead to undesirable deterioration of cycle property of charge and discharge and rate characteristics. Therefore, the thickness of the electrode layer of the positive electrode is preferably 120 µm or lower and more preferably 100 µm or lower.

A significantly small thickness of the electrode layer of the negative electrode (for one side of the collector) may lead to a reduction in the amount of the active material in the electrode material layer and thus a reduction in the battery capacity. Thus, the thickness of the electrode layer of the negative electrode is preferably 1 µm or more and more preferably 3 µm or more. A significantly large thickness of the electrode layer of the negative electrode may lead to undesirable reductions in cycle property of charge and discharge and rate characteristics. Therefore, the thickness of the electrode layer of the negative electrode is preferably 100 µm or lower and more preferably 70 µm or lower.

The lithium secondary battery can have any structure without restriction. The secondary battery may be a coin-shaped battery, a cylindrical battery, a square-shaped battery, or a laminate-type battery, each having a single layered or multi-layered separator.

The battery separator may be composed of a single layered or laminated porous film, woven fabric, or non-woven fabric of a polyolefin such as polypropylene or polyethylene.

A separator having a significantly high Gurley value (air permeability) may lead to a reduction in lithium ion conductivity and thus does not sufficiently function as a battery separator, although it depends on fabrication conditions. Therefore, the Gurley value is preferably 1000 seconds/100 cc or lower, more preferably 800 seconds/100 cc or lower, and most preferably 500 seconds/100 cc or lower. A significantly low Gurley value of the battery separator may lead to low mechanical strength. Therefore, the Gurley value is preferably 50 seconds/100 cc or more, more preferably 100 seconds/100 cc or more, and most preferably 300 seconds/100 cc or more. The porosity of the separator preferably ranges from 30% to 60%, more preferably from 35% to 55%, and most preferably from 40% to 50%, from the viewpoint of improvements in capacity characteristics of the battery.

Furthermore, a higher energy density is achieved by a smaller thickness of the separator. Thus, the thickness of the battery separator is preferably 50 µm or less, more preferably 40 µm or less, and most preferably 25 µm or less. Also, in order to ensure sufficient mechanical strength, the thickness of the battery separator is preferably 5 µm or more, more preferably 10 µm or more, and most preferably 15 µm or more.

The lithium secondary battery of the present invention exhibits excellent long-term cycle property even when the final charging voltage is 4.2 V or higher and particularly 4.3 V or higher. Furthermore, the cycle property are favorable even when the final charging voltage is 4.4 V. The final discharging voltage can be set to 2.5 V or more and preferably 2.8 V or more. Although the current value is not restricted, a constant current discharge of 0.1 C to 3 C is generally employed. The lithium secondary battery of the present invention may be charged and discharged at −40° C. to 100° C. and preferably 0° C. to 80° C.

In the present invention, a sealing plate may be provided with a relief valve, as a countermeasure against an increase in internal pressure of the lithium secondary battery. Alternatively, a cutout may be provided in a battery component such as a battery can or a gasket.

In the lithium secondary battery of the present invention, a plurality of lithium secondary batteries may be accommodated in a battery pack in series and/or in parallel, as necessary. The battery pack can be provided with an overcurrent circuit breaker, such as a PTC element, a thermal fuse, or a bimetal, as well as a safety circuit (a circuit that can monitor the voltage, the temperature, and the current of each battery and/or the entire battery pack, and can shut off the current, as necessary).

EXAMPLES

The present invention will now be described in more detail with reference to Examples and Comparative Examples. It should be noted, however, that the present invention is not limited to these Examples and includes various combinations easily deduced from the gist of the invention. In particular, the combinations of solvents in the following Examples should not be limited to these examples.

Synthesis Example I-1

[Preparation of 1,2-cyclohexanediol Cyclic Sulfite]
(1) Ten grams (86 mmol) of trans-1,2-cyclohexanediol was added to toluene containing pyridine, and 10 g (84 mmol) of thionyl chloride was added dropwise thereto for reaction. The resulting solution was distilled. A purified trans isomer of 1,2-cyclohexanediol cyclic sulfite was recovered with a yield of 90%.
(2) Similarly, 10 g (86 mmol) of cis-1,2-cyclohexanediol wad added to toluene containing pyridine, and 10 g (84 mmol) of thionyl chloride was added dropwise thereto for reaction. The resulting solution was distilled. A purified cis isomer of 1,2-cyclohexanediol cyclic sulfite was recovered with a yield of 90%.
(3) The same amount of the synthesized and purified trans isomer (trans-1,2-cyclohexanediol cyclic sulfite) and cis isomer (cis-1,2-cyclohexanediol cyclic sulfite) were mixed together to prepare a trans/cis (1/1) isomer mixture of 1,2-cyclohexanediol cyclic sulfite.

Example I-1

[Preparation of Nonaqueous Electrolytic Solution]
A nonaqueous mixed solvent having a proportion (volume basis) of EC:VC:MEC of 30:2:68 was prepared. $LiPF_6$ and $LiBF_4$ as electrolyte salts were dissolved in this solvent into a concentration of 0.95 M and 0.05 M, respectively, to prepare a nonaqueous electrolytic solution. The trans isomer of 1,2-cyclohexanediol cyclic sulfite was added to this nonaqueous electrolytic solution into a concentration of 0.1% by weight on the basis of the nonaqueous electrolytic solution. The nonaqueous solvent, the electrolyte salts, and the sulfite compound used had been preliminarily purified.
[Preparation of Lithium Secondary Battery and Measurement of Battery Characteristics]
$LiCoO_2$ (90% by weight) as a positive electrode active material, 5% by weight of acetylene black as a conductive material, and 5% by weight of polyvinylidene fluoride as a binder were mixed. This mixture was mixed with 1-methyl-2-pyrrolidone as a solvent. The resulting mixture was applied onto an aluminum foil, was dried, was compression-molded, and was heated to prepare a positive electrode. Aside from this, 95% by weight of artificial graphite (negative electrode active material) which had a graphite crystal structure having a lattice spacing ($d_{002}$) of the lattice face (002) of 0.335 nm was mixed with 5% by weight of polyvinylidene fluoride (binder). The mixture was mixed with 1-methyl-2-pyrrolidone as a solvent. The resulting mixture was applied onto a copper foil, was dried, was compression-molded, and was heated to prepare a negative electrode. A cylindrical battery of 18650 size (diameter: 18 mm, height: 65 mm) was then fabricated with a microporous polypropylene film separator. The nonaqueous electrolytic solution was poured, and then carbon dioxide having a dew point of −60° C. was incorporated before the battery was sealed. This battery was provided with a pressure release vent and an internal current breaker (PTC element). At this time, the positive electrode had an electrode density of 3.6 g/cm$^3$, whereas the negative electrode had an electrode density of 1.7 g/cm$^3$. The electrode layer of the positive electrode had a thickness (for one side of the collector) of 60 μm, whereas the electrode layer of the negative electrode had a thickness (for one side of the collector) of 60 μm.

The resulting 18650 battery was charged at a constant electric current of 2.2 A (1 C) up to a voltage of 4.2 V at a high temperature (45° C.). The charging was further continued for 3 hours in total at a constant final voltage of 4.3 V. Next, the battery was discharged at a constant electric current of 2.2 A (1 C) down to a final voltage of 2.8 V. This charge-discharge cycle was repeated. The initial charge-discharge capacity was nearly equal to that of a case (Comparative Example 1) where 1% of ethylene sulfite was added instead of the sulfite compound of the present invention and 1M $LiPF_6$ having a proportion (volume basis) of EC:VC:MEC of 30:2:68 was used as a nonaqueous electrolytic solution. The battery characteristics after 200 cycles were measured. The discharge capacity retention was 81%, of the initial discharge capacity (100%). The fabrication conditions and characteristics of the 18650 battery are summarized in Table I-1.

Examples I-2 and I-3

As in Example I-1, 18650 batteries were fabricated except that the amounts of the trans isomer of 1,2-cyclohexanediol cyclic sulfite added were 1% by weight (Example I-2) and 5% by weight (Example I-3), respectively. The characteristics of the 18650 batteries were measured. The fabrication conditions and the characteristics of the 18650 batteries are summarized in Table I-1.

Example I-4

An 18650 battery was fabricated as in Example I-1 except that 1% by weight of the cis isomer of 1,2-cyclohexanediol cyclic sulfite was added instead of the trans isomer of 1,2-cyclohexanediol cyclic sulfite. The characteristics of the 18650 battery were measured. The fabrication conditions and characteristics of the 18650 battery are summarized in Table I-1.

Example I-5

An 18650 battery was fabricated as in Example I-1 except that 1% by weight of the trans/cis (1/1) isomer mixture of 1,2-cyclohexanediol cyclic sulfite was added instead of the trans isomer of 1,2-cyclohexanediol cyclic sulfite. The characteristics of the 18650 battery were measured. The fabrication conditions and characteristics of the 18650 battery are summarized in Table I-1.

Example I-6

An 18650 battery was fabricated as in Example I-1 except that a nonaqueous mixed solvent having a proportion (volume basis) of EC/PS/MEC of 30/2/68 was prepared and 1% by weight of the trans/cis (1/1) isomer mixture of 1,2-cyclohexanediol cyclic sulfite was added instead of the trans isomer of 1,2-cyclohexanediol cyclic sulfite. The characteristics of the 18650 battery were measured. The fabrication conditions and characteristics of the 18650 battery are summarized in Table I-1.

Comparative Example I-1

An 18650 battery was fabricated as in Example I-1 except that a nonaqueous mixed solvent having a proportion (volume basis) of EC/VC/MEC of 30/2/68 was prepared, 1% by weight of ethylene sulfite was added instead of the trans isomer of 1,2-cyclohexanediol cyclic sulfite, and LiPF$_6$ and LiBF$_4$ were dissolved in this solvent into a concentration of 0.95 M and 0.05 M, respectively. The characteristics of the 18650 battery after 200 cycles were measured and the discharge capacity retention thereof was 72%. The fabrication conditions and characteristics of the 18650 battery are summarized in Table I-1.

Comparative Example I-2

An 18650 battery was fabricated as in Comparative Example I-1 except that 1% by weight of erythritan sulfite was added instead of ethylene sulfite. The characteristics of the 18650 battery were measured. The fabrication conditions and characteristics of the 18650 battery are summarized in Table I-1.

Comparative Example I-3

An 18650 battery was fabricated as in Comparative Example I-1 except that a nonaqueous mixed solvent having a proportion (volume basis) of EC/PS/MEC of 30/2/68 was prepared and 1% by weight of erythritan sulfite was added instead of ethylene sulfite. The characteristics of the 18650 battery were measured. The fabrication conditions and characteristics of the 18650 battery are summarized in Table I-1.
[Table 1]

TABLE I-1

| | Composition of electrolytic solution (Volume ratio) | 1,2-Cyclohexanediol cyclic sulfite (Amount added: wt %) | Discharge capacity retention after 200 cycles (%) |
|---|---|---|---|
| Example I-1 | 0.95 M LiPF$_6$ + 0.05 M LiBF$_4$ EC/VC/MEC = 30/2/68 | Trans isomer (0.1) | 81 |
| Example I-2 | 0.95 M LiPF$_6$ + 0.05 M LiBF$_4$ EC/VC/MEC = 30/2/68 | Trans isomer (1) | 85 |
| Example I-3 | 0.95 M LiPF$_6$ + 0.05 M LiBF$_4$ EC/VC/MEC = 30/2/68 | Trans isomer (5) | 82 |
| Example I-4 | 0.95 M LiPF$_6$ + 0.05 M LiBF$_4$ EC/VC/MEC = 30/2/68 | Cis isomer (1) | 83 |
| Example I-5 | 0.95 M LiPF$_6$ + 0.05 M LiBF$_4$ EC/VC/MEC = 30/2/68 | Trans/cis = 1/1 Isomer mixture (1) | 84 |
| Example I-6 | 0.95 M LiPF$_6$ + 0.05 M LiBF$_4$ EC/PS/MEC = 30/2/68 | Trans/cis = 1/1 Isomer mixture (1) | 85 |
| Comparative Example I-1 | 0.95 M LiPF$_6$ + 0.05 M LiBF$_4$ EC/VC/MEC = 30/2/68 | Ethylene sulfite (1) | 76 |
| Comparative Example I-2 | 0.95 M LiPF$_6$ + 0.05 M LiBF$_4$ EC/VC/MEC = 30/2/68 | Erythritan sulfite (1) | 76 |
| Comparative Example I-3 | 0.95 M LiPF$_6$ + 0.05 M LiBF$_4$ EC/PS/MEC = 30/2/68 | Erythritan sulfite (1) | 75 |

Synthesis Example II-1

[Preparation of Hexahydro-1,3,2-benzodioxathiol-2,2-dioxide]

Ten grams (86 mmol) of trans-1,2-cyclohexanediol (CAS No. 1460-57-7) was added to toluene, and 10 g (84 mmol) of thionyl chloride was added dropwise thereto for reaction. The resulting solution was distilled. A cyclohexanediol cyclic sulfite (trans isomer) was recovered with a yield of 90%. Next, a methylene chloride solution containing 10 g (62 mmol) of cyclohexanediol cyclic sulfite was mixed with 180 g of 10% sulfuric acid aqueous solution. The mixture was mixed with 11 g (70 mmol) of potassium permanganate in an ice bath for reaction. Thereafter, the excess amount of potassium permanganate was neutralized by sodium hydrogen sulfite. The solvent was then distilled away from the organic layer. The solid product was crystallized with diethyl ether. A purified hexahydro-1,3,2-benzodioxathiol-2,2-dioxide (trans isomer) was recovered with a yield of 24%.

Synthesis Example II-2

[Preparation of Hexahydro-1,3-benzodioxol-2-one (1,2-cyclohexanediol Cyclic Carbonate)]

Into 10 g (86 mmol) of trans-1,2-cyclohexanediol (CAS No. 1460-57-7) and 87.7 g (86 mmol) of dimethyl carbonate was added 0.5 g (9 mmol) of sodium methoxide. The resulting mixture was refluxed for 1 hour. After methanol was removed from the mixture, rectification was carried out. A purified hexahydro-1,3-benzodioxol-2-one (trans isomer) was recovered with a yield of 93%.

Example II-1

[Preparation of Nonaqueous Electrolytic Solution]

A nonaqueous mixed solvent having a proportion (volume basis) of ethylene carbonate (EC):vinylene carbonate (VC): methyl ethyl carbonate (MEC) of 30:2:68 was prepared in a dry nitrogen atmosphere. LiPF$_6$ and LiBF$_4$ as electrolyte salts were dissolved in this solvent into a concentration of 0.95 M and 0.05 M, respectively, to prepare a nonaqueous electrolytic solution. The trans isomer (CAS No. 6970-91-8) of hexahydro-1,3,2-benzodioxathiol-2,2-dioxide represented by the formula (IX) was added to this nonaqueous electrolytic solution into a concentration of 1% by weight on the basis of the nonaqueous electrolytic solution. The nonaqueous solvent, the electrolyte salts, and the sulfate compound used had been preliminarily purified.

[Preparation of Lithium Secondary Battery]

LiCO$_{1/3}$Ni$_{1/3}$Mn$_{1/3}$O$_2$ (90% by weight) as a positive electrode active material, acetylene black (5% by weight) as a conductive material, and polyvinylidene fluoride (5% by weight) as a binder were mixed. This mixture was mixed with 1-methyl-2-pyrrolidone as a solvent. The resulting mixture was applied onto an aluminum foil, was dried, was compression-molded, and was heated to prepare a positive electrode. Aside from this, 95% by weight of artificial graphite (negative electrode active material) which had a graphite crystal structure having a lattice spacing (d$_{002}$) of the lattice face (002) of 0.335 nm were mixed with 5% by weight of polyvinylidene fluoride (binder). The mixture was mixed with 1-methyl-2-pyrrolidone as a solvent. The resulting mixture was applied onto a copper foil, was dried, was compression-molded, and was heated to prepare a negative electrode. A size 18650 cylindrical battery (diameter: 18 mm, height: 65 mm) was fabricated with a microporous polypropylene film separator. The nonaqueous electrolytic solution was poured, and then carbon dioxide having a dew point of −60° C. was incorporated before the battery was sealed. This battery was provided with a pressure release vent and an internal current breaker (PTC element). At this time, the positive electrode had an electrode density of 3.4 g/cm$^3$, whereas the negative electrode had an electrode density of 1.7 g/cm$^3$. The electrode layer of the positive electrode had a thickness (for one side of the collector) of 55 μm, whereas the electrode layer of the negative electrode had a thickness (for one side of the collector) of 60 μm.

[Charge-Discharge Cycle Test]

The resulting 18650 battery was charged at a constant electric current of 2.3 A (1 C) up to a voltage of 4.35 V at a high temperature (45° C.). The charging was further continued for 3 hours in total at the constant final voltage of 4.35 V. Next, the battery was discharged at a constant electric current of 2.3 A (1 C) down to a final voltage of 2.8 V. This charge-discharge cycle was repeated. The initial charge-discharge capacity was nearly equal to that of a case (Comparative Example 1) where a nonaqueous mixed solvent having a proportion (volume basis) of EC:VC:MEC of 30:2:68 was prepared, and 1% by weight of ethylene glycol sulfate was added instead of the sulfate compound of the present invention using a nonaqueous electrolytic solution in which LiPF$_6$ and LiBF$_4$ as electrolyte salts were dissolved into a concentration of 0.95 M and 0.05 M, respectively. The cycle property after 200 cycles was measured. The discharge capacity retention was 82% of the initial (after 1 cycle) discharge capacity (100%). The fabrication conditions and characteristics of the 18650 battery are summarized in Table II-1.

[High-Temperature Storage Test]

Another 18650 battery containing an electrolytic solution having the same composition as above was charged at a constant electric current of 0.2 C up to a voltage of 4.35 V at 25° C. The charging was further continued for 7 hours in total at the constant final voltage of 4.35 V. Next, the battery was discharged at a constant electric current of 0.2 C down to a final voltage of 2.8 V. This charge-discharge cycle was repeated 3 times. Thereafter, the 18650 battery was charged at a constant electric current of 0.46 A (0.2 C) up to a voltage of 4.35 V at a high temperature (60° C.), and then stored for 3 days at the constant voltage of 4.35 V. The amount of gas generated in the battery during the storage, measured according to the Archimedes method, was 85% of the amount of gas generated in the battery in the case (comparative example 2) where the sulfate compound of the present invention was not added (100%). The results are summarized in Table II-1.

Example II-2

A nonaqueous electrolytic solution was prepared and a size 18650 cylindrical battery was fabricated as in Example II-1 except that the cis isomer (CAS No. 6970-90-7) of hexahydro-1,3,2-benzodioxathiol-2,2-dioxide represented by the formula (VIII) was used instead of the trans isomer of hexahydro-1,3,2-benzodioxathiol-2,2-dioxide. The charge-discharge cycle test and the high-temperature storage test were carried out. The results are summarized in Table II-1.

Examples II-3 to II-5

Nonaqueous electrolytic solutions were prepared and size 18650 cylindrical batteries were fabricated as in Example II-1 except that a specific amount of the isomer mixture of hexahydro-1,3,2-benzodioxathiol-2,2-dioxide having a ratio of the trans isomer (CAS No. 6970-91-8) represented by the formula (IX) to the cis isomer (CAS No. 6970-90-7) represented by the formula (VIII) of 60:40 was used instead of the trans isomer of hexahydro-1,3,2-benzodioxathiol-2,2-dioxide. The charge-discharge cycle test and the high-temperature storage test were carried out. The results are summarized in Table II-1.

Example II-6

A nonaqueous electrolytic solution was prepared and a size 18650 cylindrical battery was fabricated as in Example II-3 except that a nonaqueous mixed solvent having a proportion (volume basis) of ethylene carbonate (EC):1,3-propane sultone (PS):methyl ethyl carbonate (MEC) of 30:2:68 was used. The charge-discharge cycle test and the high-temperature storage test were carried out. The results are summarized in Table II-1.

Comparative Example II-1

A nonaqueous electrolytic solution was prepared and a size 18650 cylindrical battery was fabricated as in Example except that 1,3,2-dioxathiolane-2,2-dioxide was used instead of hexahydro-1,3,2-benzodioxathiol-2,2-dioxide. The charge-discharge cycle test and the high-temperature storage test were carried out. The results are summarized in Table II-1.

Comparative Example II-2

A nonaqueous electrolytic solution was prepared and a size 18650 cylindrical battery was fabricated as in Example II-1 except that hexahydro-1,3,2-benzodioxathiol-2,2-dioxide was not added. The charge-discharge cycle test and the high-temperature storage test were carried out. The results are summarized in Table II-1.

[Table 2]

TABLE II-1

| | Compositions of electrolyte salt and nonaqueous solvent (Volume ratio) | Hexahydro-1,3,2-benzodioxathiol-2,2-dioxide (Amount added: wt %) | Discharge capacity retention after 200 cycles (%) | Amount of gas generated (%) |
|---|---|---|---|---|
| Example II-1 | 0.95 M LiPF$_6$ + 0.05 M LiBF$_4$ EC/VC/MEC = 30/2/68 | Trans isomer (1) | 82 | 85 |
| Example II-2 | 0.95 M LiPF$_6$ + 0.05 M LiBF$_4$ EC/VC/MEC = 30/2/68 | Cis isomer (1) | 78 | 89 |
| Example II-3 | 0.95 M LiPF$_6$ + 0.05 M LiBF$_4$ EC/VC/MEC = 30/2/68 | Trans/cis = 60/40 Isomer mixture (1) | 79 | 87 |
| Example II-4 | 0.95 M LiPF$_6$ + 0.05 M LiBF$_4$ EC/VC/MEC = 30/2/68 | Trans/cis = 60/40 Isomer mixture (0.1) | 77 | 88 |
| Example II-5 | 0.95 M LiPF$_6$ + 0.05 M LiBF$_4$ EC/VC/MEC = 30/2/68 | Trans/cis = 60/40 Isomer mixture (5) | 76 | 90 |
| Example II-6 | 0.95 M LiPF$_6$ + 0.05 M LiBF$_4$ EC/PS/MEC = 30/2/68 | Trans/cis = 60/40 Isomer mixture (1) | 80 | 85 |
| Comparative Example II-1 | 0.95 M LiPF$_6$ + 0.05 M LiBF$_4$ EC/VC/MEC = 30/2/68 | 1,3,2-dioxathiolane-2,2-dioxide (1) | 68 | 98 |
| Comparative Example II-2 | 0.95 M LiPF$_6$ + 0.05 M LiBF$_4$ EC/VC/MEC = 30/2/68 | None | 65 | 100 |

Example II-7

A nonaqueous electrolytic solution was prepared and a size 18650 cylindrical battery was fabricated as in Example II-1 except that a nonaqueous mixed solvent having a proportion (volume basis) of ethylene carbonate (EC):vinylene carbonate (VC):methyl ethyl carbonate (MEC) of 20:2:78 was used and the trans isomer (CAS No. 20192-66-9) of hexahydro-1,3-benzodioxol-2-one represented by the formula (VI) instead of hexahydro-1,3,2-benzodioxathiol-2,2-dioxide was added into a concentration of 10% by weight. The charge-discharge cycle test and the high-temperature storage test were carried out. The results are summarized in Table II-2. The alicyclic cyclic carbonate compounds used had been preliminarily purified.

Example II-8

A nonaqueous electrolytic solution was prepared and a size 18650 cylindrical battery was fabricated as in Example except that the cis isomer (CAS No. 19456-20-3) of hexahydro-1,3-benzodioxol-2-one represented by the formula (V) was used instead of the trans isomer of hexahydro-1,3-benzodioxol-2-one. The charge-discharge cycle test and the high-temperature storage test were carried out. The results are summarized in Table II-2.

Example II-9

A nonaqueous electrolytic solution was prepared and a size 18650 cylindrical battery was fabricated as in Example II-7 except that the isomer mixture of hexahydro-1,3-benzodioxol-2-one having a ratio of the trans isomer (CAS No. 20192-66-9) represented by the formula (VI) to the cis isomer (CAS No. 19456-20-3) represented by the formula (V) of 60:40 was used instead of the trans isomer of hexahydro-1,3-benzodioxol-2-one and an electrolytic solution having a composition shown in Tale II-2 was used. The charge-discharge cycle test and the high-temperature storage test were carried out. The results are summarized in Table II-2.

Example II-10

A nonaqueous electrolytic solution was prepared and a size 18650 cylindrical battery was fabricated as in Example II-9 except that a nonaqueous mixed solvent having a proportion (volume basis) of ethylene carbonate (EC):1,3-propane sultone (PS):methyl ethyl carbonate (MEC) of 20:2:78 was used. The charge-discharge cycle test and the high-temperature storage test were carried out. The results are summarized in Table II-2.

Example II-11

A nonaqueous electrolytic solution was prepared and a size 18650 cylindrical battery was fabricated as in Example II-9 except that 1% by weight of the isomer mixture of hexahydro-1,3-benzodioxol-2-one was used. The charge-discharge cycle test and the high-temperature storage test were carried out. The results are summarized in Table II-2.

Example II-12

A nonaqueous electrolytic solution was prepared and a size 18650 cylindrical battery was fabricated as in Example II-7 except that 20% by weight of the isomer mixture of hexahydro-1,3-benzodioxol-2-one having a ratio of the trans isomer (CAS No. 20192-66-9) represented by the formula (VI) to the cis isomer (CAS No. 19456-20-3) represented by the formula (V) of 60:40 was used instead of the trans isomer of hexahydro-1,3-benzodioxol-2-one and an electrolytic solution having a proportion (volume basis) of ethylene carbonate (EC):propylene carbonate (PC):vinylene carbonate (VC):methyl ethyl carbonate (MEC) of 5:5:2:88 was used in Example II-7. The charge-discharge cycle test and the high-temperature storage test were carried out. The results are summarized in Table II-2.

[Table 3]

TABLE II-2

| | Compositions of electrolyte salt and nonaqueous solvent (Volume ratio) | Hexahydro-1,3-benzodioxol-2-one (Amount added: wt %) | Discharge capacity retention after 200 cycles (%) | Amount of gas generated (%) |
|---|---|---|---|---|
| Example II-7 | 0.95 M $LiPF_6$ + 0.05 M $LiBF_4$ EC/VC/MEC = 20/2/78 | Trans isomer (10) | 71 | 56 |
| Example II-8 | 0.95 M $LiPF_6$ + 0.05 M $LiBF_4$ EC/VC/MEC = 20/2/78 | Cis isomer (10) | 69 | 59 |
| Example II-9 | 0.95 M $LiPF_6$ + 0.05 M $LiBF_4$ EC/VC/MEC = 20/2/78 | Trans/cis = 60/40 Isomer mixture (10) | 70 | 57 |
| Example II-10 | 0.95 M $LiPF_6$ + 0.05 M $LiBF_4$ EC/PS/MEC = 20/2/78 | Trans/cis = 60/40 Isomer mixture (10) | 71 | 56 |
| Example II-11 | 0.95 M $LiPF_6$ + 0.05 M $LiBF_4$ EC/VC/MEC = 30/2/68 | Trans/cis = 60/40 Isomer mixture (1) | 73 | 92 |
| Example II-12 | 0.95 M $LiPF_6$ + 0.05 M $LiBF_4$ EC/PC/VC/MEC = 5/5/2/88 | Trans/cis = 60/40 Isomer mixture (20) | 69 | 28 |

The lithium secondary batteries of Examples II-1 to II-12 exhibit excellent long-term cycle property, reduce gas generation, and can maintain battery characteristics for prolonged periods, compared to the lithium secondary batteries in Comparative Examples not containing hexahydro-1,3,2-benzodioxathiol-2,2-dioxide and/or hexahydro-1,3-benzodioxol-2-one.

Synthesis Example III-1

[Preparation of 5-vinyl-hexahydro-1,3,2-benzodioxathiol-2-oxide (4-vinyl-1,2-cyclohexanediol Cyclic Sulfite)]

Twenty grams (141 mmol) of 4-vinyl-trans-1,2-cyclohexanediol was dissolved in 100 ml of toluene containing 34 g (424 mmol) of pyridine and cooled to 5° C. Into a mixture, 18 g (151 mmol) of thionyl chloride was slowly added dropwise and stirred for 2 hours at room temperature to prepare a reaction solution. Thereafter, the reaction solution was filtrated, was washed with water, and was then dried over anhydrous magnesium sulfate. After the solvent was distilled away, distillation purification was carried out. Nine grams of purified 5-vinyl-hexahydro-1,3,2-benzodioxathiol-2-oxide (trans isomer) was recovered with a yield of 34%. The analytical results are summarized below.

Boiling point: 105-107° C./3 mmHg
$^1$H-NMR ($CDCl_3$/TMS): 1.50-2.40 ppm (m, 6H, cyclohexane), 2.80 ppm (m, 1H, C=C—CH—), 3.81 ppm (m, 1H, $OSO_2$—CH), 4.40 ppm (m, 1H, $OSO_2$—CH), 5.15 ppm (m, 2H, $CH_2$=C), 5.80 ppm (m, 1H, C=CH—)

Synthesis Example III-2

[Preparation of 5-vinyl-trans-hexahydro-1,3-benzodioxol-2-one (4-vinyl-1,2-cyclohexanediol Cyclic Carbonate)]

Nine grams (63 mmol) of 4-vinyl-trans-1,2-cyclohexanediol was dissolved in 80 ml of toluene containing 16 g (160 mmol) of triethylamine and cooled to 5° C. Into a mixture, 6 g (21 mmol) of triphosgene dissolved in dichloromethane was slowly added dropwise, and then stirred for 3 hours at room temperature to prepare a reaction solution. Thereafter, the reaction solution was filtrated, was washed with water, and was then dried over anhydrous magnesium sulfate. After the solvent was distilled away, distillation purification was carried out. Thus, 4.5 g of purified 5-vinyl-hexahydro-1,3-benzodioxol-2-one (trans isomer) was recovered with a yield of 42%. The analytical results are summarized below.

Boiling point: 110-113° C./3 mmHg
$^1$H-NMR ($CDCl_3$/TMS): 1.50-2.40 ppm (m, 6H, cyclohexane), 2.82 ppm (m, 1H, C=C—CH—), 4.05 ppm (m, 1H, $OCO_2$—CH), 4.18 ppm (m, 1H, $OCO_2$—CH), 5.17 ppm (m, 2H, $CH_2$=C), 5.84 ppm (m, 1H, C=CH—)

Synthesis Example III-3

[Preparation of 5-vinyl-cis-hexahydro-1,3-benzodioxol-2-one (4-vinyl-1,2-cyclohexanediol Cyclic Carbonate)]

Into 100 ml of acetic acid were dissolved 7.5 g (70 mmol) of 4-vinyl-1-cyclohexene and 3.7 g (17 mmol) of potassium iodate in a nitrogen atmosphere. Then, 8.8 g (35 mmol) of iodine was added dropwise with stirring to prepare a solution. The solution was stirred for 1 hour at 60° C. Then, 6.9 g (70 mmol) of potassium acetate was further added followed by heating reflux for 3 hours at 110° C. The resulting solution was cooled to room temperature and was mixed with 100 ml of water. 4-Vinyl-cyclohexanedioldiacetyl (cis isomer) (11.6 g, 74%) was extracted with hexane. The recovered diacetyl compound was dissolved in 30 ml of toluene, and 30 ml of 10% potassium hydroxide-methanol solution was added to the solution. The mixed solution was heat-refluxed for 4 hours and then cooled. The reaction product was extracted with ethyl acetate. The solvent was distilled out under reduced pressure and thus 5.2 g (53%) of 4-vinyl-cis-1,2-cyclohexanediol was recovered. Five grams of the obtained diol compound was reacted with 25 ml of toluene, 8.5 g (106 mmol) of pyridine, and 4.5 g (38 mmol) of thionyl chloride as in the preparation of the trans isomer. After distillation purification, 2.3 g of purified 5-vinyl-hexahydro-1,3,2-benzodioxathiol-2-oxide (cis isomer) was recovered with a yield of 33%.

Boiling point: 100° C./1.5 mmHg
$^1$H-NMR ($CDCl_3$/TMS): 1.07-2.44 ppm (m, 6H, cyclohexane), 2.10 ppm (m, 1H, C=C—CH—), 4.00-4.85 ppm (m, 2H, $OSO_2$—CH), 5.00 ppm (m, 2H, $CH_2$=C), 5.73 ppm (m, 1H, C=CH—)

Example III-1

[Preparation of Nonaqueous Electrolytic Solution]

A nonaqueous mixed solvent having a proportion (volume basis) of ethylene carbonate (EC):vinylene carbonate (VC):methyl ethyl carbonate (MEC) of 30:2:68 was prepared in a dry nitrogen atmosphere. $LiPF_6$ and $LiBF_4$ as electrolyte salts were dissolved in this mixed solvent into a concentration of 0.95 M and 0.05 M, respectively, to prepare a nonaqueous electrolytic solution. The trans isomer of 5-vinyl-hexahydro-1,3,2-benzodioxathiol-2-oxide (4-vinyl-1,2-cyclohexanediol cyclic sulfite) represented by the general formula (XI) was added to this nonaqueous electrolytic solution into a concentration of 1.5% by weight on the basis of the nonaqueous electrolytic solution. The nonaqueous solvent, the electrolyte salts, and the sulfite compound used had been preliminarily purified.

[Fabrication of Lithium Secondary Battery]

$LiCo_{0.98}Mg_{0.02}O_2$ (90% by weight) as a positive electrode active material, acetylene black (5% by weight) as a conductive material, and polyvinylidene fluoride (5% by weight) as a binder were mixed. This mixture was mixed with 1-methyl-2-pyrrolidone as a solvent. The resulting mixture was applied onto an aluminum foil, was dried, was compression-molded, and was heated to prepare a positive electrode. Aside from this, 95% by weight of artificial graphite (negative electrode active material) which had a graphite crystal structure having a lattice spacing ($d_{002}$) of the lattice face (002) of 0.335 nm, and of which the surface was coated with amorphous carbon was mixed with 5% by weight of polyvinylidene fluoride as a binder. The mixture was mixed with 1-methyl-2-pyrrolidone as a solvent. The resulting mixture was applied onto a copper foil, was dried, was compression-molded, and was heated to prepare a negative electrode. A cylindrical battery of 18650 size (diameter: 18 mm, height: 65 mm) was fabricated with a microporous polypropylene film separator. The nonaqueous electrolytic solution was poured, and then carbon dioxide having a dew point of −60° C. was incorporated before the battery was sealed. This battery was provided with a pressure release vent and an internal current breaker (PTC element). At this time, the positive electrode had an electrode density of 3.6 g/cm$^3$, whereas the negative electrode had an electrode density of 1.7 g/cm$^3$. The electrode layer of the positive electrode had a thickness (for one side of the collector) of 60 μm, whereas the electrode layer of the negative electrode had a thickness (for one side of the collector) of 60 μm.

[Charge-Discharge Cycle Test]

The resulting 18650 battery was charged at a constant electric current of 2.2 A (1 C) up to a voltage of 4.3 V at a high temperature (45° C.). The charging was further continued for 3 hours in total at the constant final voltage of 4.3 V. Next, the battery was discharged at a constant electric current of 2.2 A (1 C) down to a final voltage of 2.8 V. The charge-discharge cycle was repeated. The initial charge-discharge capacity was nearly equal to that of the case (Comparative Example 1) where a nonaqueous mixed solvent having a proportion (volume basis) of EC:VC:MEC of 30:2:68 was prepared, a nonaqueous electrolytic solution in which $LiPF_6$ and $LiBF_4$ as electrolyte salts were dissolved in this solvent into a concentration of 0.95 M and 0.05 M, respectively, was used, and the sulfite compound of the present invention was not added. The cycle property after 200 cycles was measured. The discharge capacity retention was 86% of the initial discharge capacity (100%) (after 1 cycle). The fabrication conditions and characteristics of the 18650 battery are summarized in Table III-1.

[High-Temperature Storage Test]

Another 18650 battery containing an electrolytic solution having the same composition as above was charged at a constant electric current of 0.2 C up to a voltage of 4.3 V at 25° C. The charging was further continued for 7 hours in total at the constant final voltage of 4.3 V. Next, the battery was discharged at a constant electric current of 0.2 C down to a final voltage of 2.8 V. The charge-discharge cycle was repeated 3 times. Thereafter, the 18650 battery was charged at a constant electric current of 0.44 A (0.2 C) up to a voltage of 4.3 V at a high temperature (60° C.), and then stored for 3 days at the constant voltage of 4.3 V. The amount of gas generated in the battery during the storage, measured according to the Archimedes method, was 70% of the amount of gas generated in the battery in the case where the sulfate compound of the present invention was not added (100%). The results are summarized in Table III-1.

Examples III-2 and III-3

Nonaqueous electrolytic solutions were prepared and size 18650 cylindrical batteries were fabricated as in Example III-1 except that specific amounts of the trans isomer of 5-vinyl-hexahydro-1,3,2-benzodioxathiol-2-oxide (Table III-1) were used. The charge-discharge cycle test and the high-temperature storage test were carried out. The results are summarized in Table III-1.

Example III-4

A nonaqueous electrolytic solution was prepared and a size 18650 cylindrical battery was fabricated as in Example III-1 except that a nonaqueous mixed solvent having a proportion (volume basis) of ethylene carbonate (EC):1,3-propane sultone (PS):methyl ethyl carbonate (MEC) of 30:2:68 was used in Example III-3. The charge-discharge cycle test and the high-temperature storage test were carried out. The results are summarized in Table III-1.

Example III-5

A nonaqueous electrolytic solution was prepared and a size 18650 cylindrical battery was fabricated as in Example III-1 except that the cis isomer of 5-vinyl-hexahydro-1,3,2-benzodioxathiol-2-oxide was used instead of the trans isomer thereof. The charge-discharge cycle test and the high-temperature storage test were carried out. The results are summarized in Table III-1.

Example III-6

A nonaqueous electrolytic solution was prepared and a size 18650 cylindrical battery was fabricated as in Example III-1 except that the isomer mixture of 5-vinyl-hexahydro-1,3,2-benzodioxathiol-2-oxide having a ratio of the trans isomer to the cis isomer of 60:40 was used instead of the trans isomer thereof. The charge-discharge cycle test and the high-temperature storage test were carried out. The results are summarized in Table III-1.

Comparative Example III-1

A nonaqueous electrolytic solution was prepared and a size 18650 cylindrical battery was fabricated as in Example except that hexahydro-1,3,2-benzodioxathiol-2-oxide derivatives were not added. The charge-discharge cycle test and the high-temperature storage test were carried out. The results are summarized in Table III-1. [Table 4]

TABLE III-1

| | Compositions of electrolyte salt and nonaqueous solvent (Volume ratio) | 5-Vinyl-hexahydro-1,3,2-benzodioxathiol-2-oxide (Amount added: wt %) | Discharge capacity retention after 200 cycles (%) | Amount of gas generated (%) |
|---|---|---|---|---|
| Example III-1 | 0.95 M $LiPF_6$ + 0.05 M $LiBF_4$ EC/VC/MEC = 30/2/68 | Trans isomer (1.5) | 86 | 70 |
| Example III-2 | 0.95 M $LiPF_6$ + 0.05 M $LiBF_4$ EC/VC/MEC = 30/2/68 | Trans isomer (0.1) | 83 | 73 |
| Example III-3 | 0.95 M $LiPF_6$ + 0.05 M $LiBF_4$ EC/VC/MEC = 30/2/68 | Trans isomer (5) | 82 | 74 |
| Example III-4 | 0.95 M $LiPF_6$ + 0.05 M $LiBF_4$ EC/PS/MEC = 30/2/68 | Trans isomer (1.5) | 87 | 69 |
| Example III-5 | 0.95 M $LiPF_6$ + 0.05 M $LiBF_4$ EC/VC/MEC = 30/2/68 | Cis isomer (1.5) | 83 | 74 |
| Example III-6 | 0.95 M $LiPF_6$ + 0.05 M $LiBF_4$ EC/VC/MEC = 30/2/68 | Trans/cis = 60/40 Isomer mixture (1.5) | 85 | 71 |
| Comparative Example III-1 | 0.95 M $LiPF_6$ + 0.05 M $LiBF_4$ EC/VC/MEC = 30/2/68 | 0 | 72 | 100 |

Example III-7

A nonaqueous electrolytic solution was prepared and a size 18650 cylindrical battery was fabricated as in Example except that the trans isomer of 5-vinyl-hexahydro-1,3-benzodioxol-2-one (4-vinyl-1,2-cyclohexanediol cyclic carbonate) (Synthesis Example III-2) was used instead of the trans isomer of 5-vinyl-hexahydro-1,3,2-benzodioxathiol-2-oxide, and an electrolytic solution having the composition shown in Table III-2 was used. The charge-discharge cycle test and the high-temperature storage test were carried out. The results are summarized in Table III-2.

Example III-8

A nonaqueous electrolytic solution was prepared and a size 18650 cylindrical battery was fabricated as in Example III-7 except that 0.1% by weight of the trans isomer of 5-vinyl-hexahydro-1,3-benzodioxol-2-one was used. The charge-discharge cycle test and the high-temperature storage test were carried out. The results are summarized in Table III-2.

Example III-9

A nonaqueous electrolytic solution was prepared and a size 18650 cylindrical battery was fabricated as in Example III-7 except that 5% by weight of the trans isomer of 5-vinyl-hexahydro-1,3-benzodioxol-2-one was used. The charge-discharge cycle test and the high-temperature storage test were carried out. The results are summarized in Table III-2.

Example III-10

A nonaqueous electrolytic solution was prepared and a size 18650 cylindrical battery was fabricated as in Example III-7 except that 10% by weight of the trans isomer of 5-vinyl-hexahydro-1,3-benzodioxol-2-one was used. The charge-discharge cycle test and the high-temperature storage test were carried out. The results are summarized in Table III-2.

Example III-11

A nonaqueous electrolytic solution was prepared and a size 18650 cylindrical battery was fabricated as in Example III-7 except that 15% by weight of the trans isomer of 5-vinyl-hexahydro-1,3-benzodioxol-2-one was used. The charge-discharge cycle test and the high-temperature storage test were carried out. The results are summarized in Table III-2.

Example III-12

A nonaqueous electrolytic solution was prepared and a size 18650 cylindrical battery was fabricated as in Example III-7 except that an electrolytic solution having a proportion (volume basis) of ethylene carbonate (EC):1,3-propane sultone (PS):methyl ethyl carbonate (MEC) of 30:2:68 was used. The charge-discharge cycle test and the high-temperature storage test were carried out. The results are summarized in Table III-2.

Example III-13

A nonaqueous electrolytic solution was prepared and a size 18650 cylindrical battery was fabricated as in Example III-9 except that the cis isomer of 5-vinyl-hexahydro-1,3-benzodioxol-2-one was used instead of the trans isomer thereof. The charge-discharge cycle test and the high-temperature storage test were carried out. The results are summarized in Table III-2.

Example III-14

A nonaqueous electrolytic solution was prepared and a size 18650 cylindrical battery was fabricated as in Example III-9 except that the isomer mixture of 5-vinyl-hexahydro-1,3-benzodioxol-2-one having a ratio of the trans isomer to the cis isomer (Synthesis Example III-3) of 60:40 was used instead of the trans isomer thereof, and an electrolytic solution having the composition shown in Table III-2 was used. The charge-discharge cycle test and the high-temperature storage test were carried out. The results are summarized in Table III-2.

[Table 5]

TABLE III-2

|  | Compositions of electrolyte salt and nonaqueous solvent (Volume ratio) | 5-Vinyl-hexahydro-1,3-benzodioxol-2-one (Amount added: wt %) | Discharge capacity retention after 200 cycles (%) | Amount of gas generated (%) |
|---|---|---|---|---|
| Example III-7 | 0.95 M LiPF$_6$ + 0.05 M LiBF$_4$ EC/VC/MEC = 30/2/68 | Trans isomer (1) | 83 | 67 |
| Example III-8 | 0.95 M LiPF$_6$ + 0.05 M LiBF$_4$ EC/VC/MEC = 30/2/68 | Trans isomer (0.1) | 82 | 70 |
| Example III-9 | 0.95 M LiPF$_6$ + 0.05 M LiBF$_4$ EC/VC/MEC = 30/2/68 | Trans isomer (5) | 86 | 63 |
| Example III-10 | 0.95 M LiPF$_6$ + 0.05 M LiBF$_4$ EC/VC/MEC = 30/2/68 | Trans isomer (10) | 84 | 61 |
| Example III-11 | 0.95 M LiPF$_6$ + 0.05 M LiBF$_4$ EC/VC/MEC = 30/2/68 | Trans isomer (15) | 81 | 60 |
| Example III-12 | 0.95 M LiPF$_6$ + 0.05 M LiBF$_4$ EC/PS/MEC = 30/2/68 | Trans isomer (5) | 84 | 71 |
| Example III-13 | 0.95 M LiPF$_6$ + 0.05 M LiBF$_4$ EC/VC/MEC = 30/2/68 | Cis isomer (5) | 83 | 66 |
| Example III-14 | 0.95 M LiPF$_6$ + 0.05 M LiBF$_4$ EC/VC/MEC = 30/2/68 | Trans/cis = 60/40 Isomer mixture (10) | 84 | 61 |

The lithium secondary batteries of Examples III-1 to III-14 exhibit excellent long-term cycle property and reduced gas generation, and can maintain battery characteristics for prolonged periods, compared to the lithium secondary batteries in Comparative Examples not containing 1,2-cyclohexanediol derivatives represented by the general formula (X).

INDUSTRIAL APPLICABILITY

A lithium secondary battery having excellent battery characteristics such as cycle property, electrical capacity, and storage property can be produced by using the nonaqueous electrolytic solution of the present invention. The obtained secondary battery may be fabricated in the form of a cylindrical battery, a square-shaped battery, a coin-shaped battery, a laminate-type battery, or any other type of battery.

The invention claimed is:

1. A nonaqueous electrolytic solution wherein an electrolyte salt is dissolved in a nonaqueous solvent, comprising 0.01% to 30% by weight of at least one compound selected from the group consisting of 1,2-cyclohexanediol cyclic sulfite, hexahydro-1,3,2-benzodioxathiol-2,2-dioxide, and 1,2-cyclohexanediol derivatives represented by the following general formula (X), on the basis of the weight of the nonaqueous electrolytic solution:

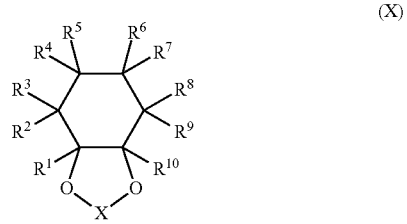

wherein $R^1$ to $R^{10}$ each independently represent a hydrogen atom, a C1 to C12 alkyl group, a C2 to C12 alkenyl group, a C2 to C12 alkynyl group, a C6 to C18 aryl group, or a C1 to C12 alkoxy group, and may bond to each other to form a ring structure, and any hydrogen atom of $R^1$ to $R^{10}$ may be substituted by a halogen atom, with the proviso that the case where all of $R^1$ to $R^{10}$ are hydrogen atoms is excluded; and X represents a >S=O group or a >C=O group.

2. The nonaqueous electrolytic solution according to claim 1, wherein the content of 1,2-cyclohexanediol cyclic sulfite ranges from 0.01% to 10% by weight, the content of hexahydro-1,3,2-benzodioxathiol-2,2-dioxide ranges from 0.01% to 10% by weight, and the content of 1,2-cyclohexanediol derivatives represented by the general formula (X) ranges from 0.01% to 20% by weight, on the basis of the weight of the nonaqueous electrolytic solution.

3. The nonaqueous electrolytic solution according to claim 1, wherein the nonaqueous solvent contains a cyclic carbonate and a linear carbonate.

4. The nonaqueous electrolytic solution according to claim 1, wherein the nonaqueous electrolytic solution further contains at least one compound selected from the group consisting of vinylene carbonate, 1,3-propane sultone, and triple bond-containing compounds.

5. The nonaqueous electrolytic solution according to claim 1, wherein the electrolyte salt is a lithium salt.

6. The nonaqueous electrolytic solution according to claim 1, wherein the electrolyte salt is LiPF$_6$, LiBF$_4$ or LiClO$_4$.

7. The nonaqueous electrolytic solution according to claim 1, wherein the electrolyte salt is LiN(SO$_2$CF$_3$)$_2$.

8. The nonaqueous electrolytic solution according to claim 1, wherein the electrolyte salt is LiPF$_6$.

9. The nonaqueous electrolytic solution according to claim 1, wherein the electrolyte salt comprises a combination of two or more lithium salts.

10. The nonaqueous electrolytic solution according to claim 1, wherein the electrolyte salt comprises a combination of LiPF$_6$ and LiBF$_4$.

11. The nonaqueous electrolytic solution according to claim 1, wherein the electrolyte salt comprises a combination of LiPF$_6$ and LiN(SO$_2$CF$_3$)$_2$.

12. The nonaqueous electrolytic solution according to claim 1, wherein the electrolyte salt comprises a combination of LiBF$_4$ and LiN(SO$_2$CF$_3$)$_2$.

13. The nonaqueous electrolytic solution according to claim 1, further comprising dissolved carbon dioxide.

14. The nonaqueous electrolytic solution according to claim 1, further comprising 0.1% to 5% by weight of an aromatic compound.

15. The nonaqueous electrolytic solution according to claim 1, wherein said compound is 1,2-cyclohexanediol cyclic sulfite.

16. The nonaqueous electrolytic solution according to claim 1, wherein said compound is hexahydro-1,3,2-benzodioxathiol-2,2-dioxide.

17. The nonaqueous electrolytic solution according to claim 1, wherein said compound is the 1,2-cyclohexanediol derivatives represented by general formula (X).

18. The nonaqueous electrolytic solution according to claim 1, wherein X in formula (X) represents a >S=O group.

19. The nonaqueous electrolytic solution according to claim 1, wherein X in formula (X) represents a >C=O group.

20. A lithium secondary battery comprising a positive electrode, a negative electrode, and a nonaqueous electrolytic solution in which an electrolyte salt is dissolved in a nonaqueous solvent, wherein the nonaqueous electrolytic solution comprises 0.01% to 30% by weight of at least one compound selected from the group consisting of 1,2-cyclohexanediol cyclic sulfite, hexahydro-1,3,2-benzodioxathiol-2,2-dioxide, and 1,2-cyclohexanediol derivatives represented by the general formula (X), on the basis of the weight of the nonaqueous electrolytic solution.

21. The lithium secondary battery according to claim 20, wherein the content of 1,2-cyclohexanediol cyclic sulfite ranges from 0.01% to 10% by weight, the content of hexahydro-1,3,2-benzodioxathiol-2,2-dioxide ranges from 0.01% to 10% by weight, and the content of 1,2-cyclohexanediol derivatives represented by the general formula (X) ranges from 0.01% to 20% by weight, on the basis of the weight of the nonaqueous electrolytic solution.

\* \* \* \* \*